United States Patent
Boccio et al.

(10) Patent No.: US 8,789,796 B2
(45) Date of Patent: Jul. 29, 2014

(54) HIGH CAPACITY BROADBAND SATELLITE

(75) Inventors: Joel Francis Boccio, Palo Alto, CA (US); Gerrit Van Ommering, Gold River, CA (US); Walter S. Gelon, Redwood City, CA (US); Steven Daniel Perez, Boulder Creek, CA (US); Eric V. Werner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 185 days.

(21) Appl. No.: 13/101,944

(22) Filed: May 5, 2011

(65) Prior Publication Data

US 2012/0068019 A1 Mar. 22, 2012

Related U.S. Application Data

(60) Provisional application No. 61/383,672, filed on Sep. 16, 2010.

(51) Int. Cl.
*B64G 1/22* (2006.01)
*B64G 1/66* (2006.01)

(52) U.S. Cl.
USPC ............ 244/172.6; 244/158.1; 244/173.1

(58) Field of Classification Search
USPC .......... 244/172.6, 172.7, 173.1, 173.3, 158.1, 244/158.5
See application file for complete search history.

(56) References Cited

U.S. PATENT DOCUMENTS

| | | | |
|---|---|---|---|
| 3,576,566 A * | 4/1971 | Cover et al. | 343/705 |
| 4,634,086 A * | 1/1987 | Mori | 244/172.6 |
| 5,833,175 A * | 11/1998 | Caplin | 244/158.1 |
| 5,963,182 A * | 10/1999 | Bassily | 343/912 |
| 5,969,695 A * | 10/1999 | Bassily et al. | 343/915 |
| 5,996,940 A * | 12/1999 | McVey et al. | 244/173.1 |
| 6,384,800 B1 * | 5/2002 | Bassily et al. | 343/912 |
| 6,424,314 B1 * | 7/2002 | Baghdasarian et al. | 343/882 |
| 6,669,147 B2 * | 12/2003 | Bertheux et al. | 244/172.6 |
| 7,104,506 B1 * | 9/2006 | Goodzeit et al. | 244/172.7 |
| 7,180,470 B1 * | 2/2007 | Hentosh | 343/882 |

(Continued)

FOREIGN PATENT DOCUMENTS

JP 10209747 8/1998

OTHER PUBLICATIONS

U.S. Appl. No. 13/026,175, filed Feb. 11, 2011, entitled "Satellite Having Multiple Aspect Ratios," by Walter Gelon.

(Continued)

*Primary Examiner* — Tien Dinh
*Assistant Examiner* — Steven Hawk
(74) *Attorney, Agent, or Firm* — Weaver Austin Villeneuve & Sampson LLP (57) ABSTRACT

A high capacity broadband service is provided from an Earth orbiting satellite having a payload that includes multiple large antennas, the satellite having an inverted configuration when deployed on orbit. The satellite has an aft surface proximate to a launch vehicle structural interface, a forward surface opposite to said aft surface, and a structure disposed therebetween. In a launch configuration, two or more deployable antennas are disposed, undeployed, on or proximate to and forward of the forward surface; on-orbit, the payload is operable when the satellite is disposed with the aft surface substantially Earth facing while the forward surface is substantially facing in an anti-Earth direction. Each deployable antenna is disposed, so as to be Earth facing, when deployed, in a position substantially forward and outboard of the forward surface.

32 Claims, 7 Drawing Sheets

(56) References Cited

U.S. PATENT DOCUMENTS

2002/0145082 A1*  10/2002  Bertheux et al. ............... 244/163
2003/0057328 A1*  3/2003   Maruno et al. ............ 244/158 R
2008/0111031 A1*  5/2008   Mobrem .................... 244/172.6
2008/0143636 A1*  6/2008   Couchman et al. ........... 343/915

OTHER PUBLICATIONS

U.S. Appl. No. 13/215,929, filed Aug. 23, 2011, entitled "Extendable Antenna Reflector Deployment Techniques," by Varouj G. Baghdasarian.

U.S. Appl. No. 13/215,932, filed Aug. 23, 2011, entitled "Reflector Deployment Techniques for Satellites," by Varouj G. Baghdasarian et al.

PCT International Search Report and Written Opinion dated Dec. 29, 2011 issued in PCT/US2011/049183.

Persinger et al. "The Intelsat V1 Antenna System" Comsat Technical Review, Communications Satellite Corporation, vol. 21, No. 1, Mar. 1, 1991, pp. 149-187.

Wilson et al. "Future Radiometer Systems for Earth Remote Sensing" Microwave Symposium Digest, 1999 IEEE MTT-S Jun. 13, 1999 pp. 395-398.

* cited by examiner

HIGH CAPACITY BROADBAND SATELLITE

CROSS-REFERENCE TO RELATED APPLICATION

The present patent application claims the priority benefit of commonly owned U.S. provisional patent application 61/383,672, filed Sep. 16, 2010, entitled "High Capacity Broadband Satellite", which is hereby incorporated by reference in its entirety into the present patent application.

TECHNICAL FIELD

This invention relates generally to enabling high capacity broadband service from an Earth orbiting satellite, and particularly to a configuration of such satellite having multiple large antennas.

BACKGROUND

The assignee of the present invention manufactures and deploys spacecraft for, inter alia, communications and broadcast services. Market demands for such spacecraft have imposed increasingly stringent requirements on spacecraft payloads. For example, broadband service providers desire spacecraft with increased data rate capacity at higher EIRP through each of an increased number of user spot beans. To meet the more stringent demands, a high power (20 KW+) spacecraft capable of providing at least 200 Gbps total data bandwidth distributed across at least one hundred spot beams is desirable. A spacecraft configuration appropriate to such a demand may be required to accommodate several antenna reflectors, each having a diameter of three to five meters. Because preferred antenna optics have a ratio of focal length (f) to antenna diameter (d) of two or greater a focal length of six to ten meters should be accommodated.

Launch vehicle compatibility is a second requirement faced by a spacecraft designer. The increased performance requirements are only advantageously met if compatibility with conventional, commercially available launch vehicles is maintained. This means, for example, that a spacecraft, as configured for launch, should be maintained within a mass and fairing envelope compatible with multiple launch vehicles, including, for example, Ariane V, Atlas XEPF, Proton, and Sea Launch.

Thus, there is a need for a high power broadband spacecraft, having multiple large antenna reflectors with long focal lengths, that is compatible with such conventional launch vehicle constraints.

SUMMARY OF INVENTION

The present inventors have recognized that a high capacity broadband service, providing a data capacity of at least 200 Gbps and at least 100 user beams, may be achieved from an Earth orbiting satellite having a payload that includes multiple large antennas deployed on orbit. The satellite has an aft surface proximate to a launch vehicle structural interface, a forward surface opposite to said aft surface, and a main body structure disposed therebetween. In a launch configuration, two or more deployable antenna reflectors may be disposed, undeployed, on or proximate to and forward of the forward surface; on-orbit, the payload may be operable when the satellite is disposed with the aft surface substantially Earth facing while the forward surface is substantially facing in an anti-Earth direction. At least one deployable antenna may be disposed, in the on-orbit configuration, so as to be Earth facing, when deployed, in a position substantially forward and outboard of the forward surface.

In an embodiment, at least four deployable antenna reflectors may be disposed, on or proximate to and forward of the forward surface. At least one deployable antenna reflector may be unfurlable.

In another embodiment, at least one deployable antenna reflector has a diameter, when deployed, of at least three meters, and is disposed, when furled, in a relatively compact, approximately cylindrical, volume.

In a further embodiment, at least one deployable antenna reflector has a diameter, when deployed, that exceeds three meters and a focal length that exceeds six meters. An antenna feed illuminating at least one deployable antenna reflector may be located approximately equidistant from the aft surface and the forward surface.

In an embodiment, the average length of a plurality of waveguides serving the antenna feed is minimized.

In a further embodiment, the average length of the plurality of waveguides serving the antenna feed is approximately three meters. The average line loss associated with the plurality of waveguides may be no greater than 3 dB.

In another embodiment, the average line loss associated with the plurality of waveguides may be approximately 1.5 dB.

In a further embodiment, torques resulting from thruster plume impingement on an antenna reflector may be substantially eliminated.

In an embodiment, an antenna pointing error is less than 0.028 degrees.

In a further embodiment, the antenna pointing error is less than 0.023 degrees.

In an embodiment, the spacecraft may be compatible with a plurality of conventional launch vehicles. The plurality of conventional launch vehicles may include at least two of: Ariane V, Atlas XEPF, Proton, and Sea Launch.

BRIEF DESCRIPTION OF THE DRAWINGS

Features of the invention are more fully disclosed in the following detailed description of the preferred embodiments, reference being had to the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings.

This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

Figure 1A:
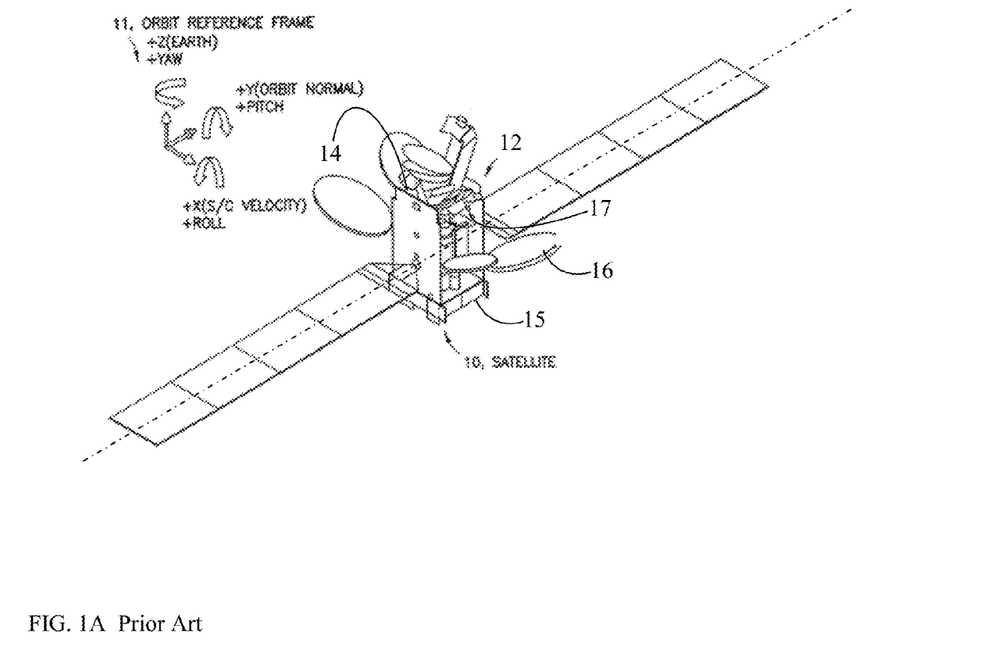
FIG. 1 illustrates a satellite configuration of the prior art.
Figure 1B:
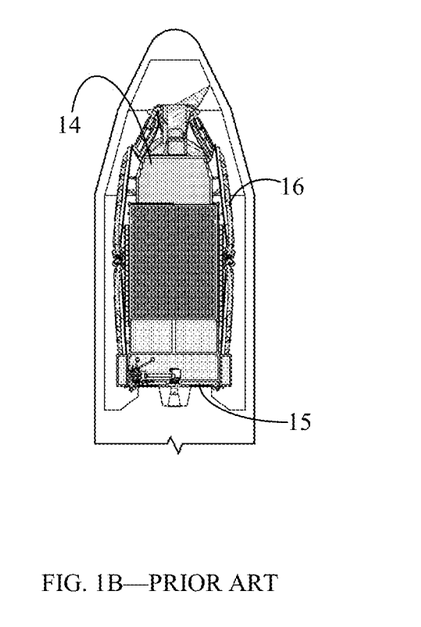

In an embodiment, a high capacity broadband service from an Earth orbiting satellite having a payload that includes multiple large antennas may be advantageously provided by a satellite operable on orbit in aft surface Earth facing configuration. A better understanding of the term "aft surface Earth facing", as the term is used herein, may be achieved by first referring to FIG. 1A which depicts a spacecraft configuration of the prior art. An Earth pointing three axis stabilized satellite 10 is illustrated within a reference spacecraft body coordinate frame 11 having roll (x), pitch (y) and yaw (z) axes. Conventionally, the yaw axis is defined as being directed along a line intersecting the Earth center of mass and spacecraft center of mass; the roll axis is defined as being perpendicular to the yaw axis, lying in the plane of the orbit in the direction of the spacecraft velocity vector; and the pitch axis (y), normal to the orbit plane, completes a three-axis, right-hand orthogonal system. Satellite 10 has a main body 12 having a forward surface 14 and an aft surface 15. As may be observed in FIG. 1B, aft surface 15 is proximate to or includes a launch vehicle structural interface (i.e., a structural interface adapter suitable for mating to a launch vehicle). When operating normally on orbit, forward surface 14 will ordinarily be Earth facing; aft surface 15 will ordinarily be directed in the anti-Earth direction. One or more deployable reflectors 16, when deployed on orbit, illuminate the Earth. During operation deployable reflector 16 is ordinarily illuminated by a feed element 17. When in a launch configuration, reflectors 16 are folded proximate to the satellite main body, as illustrated in FIG. 1B.

Figure 2A:
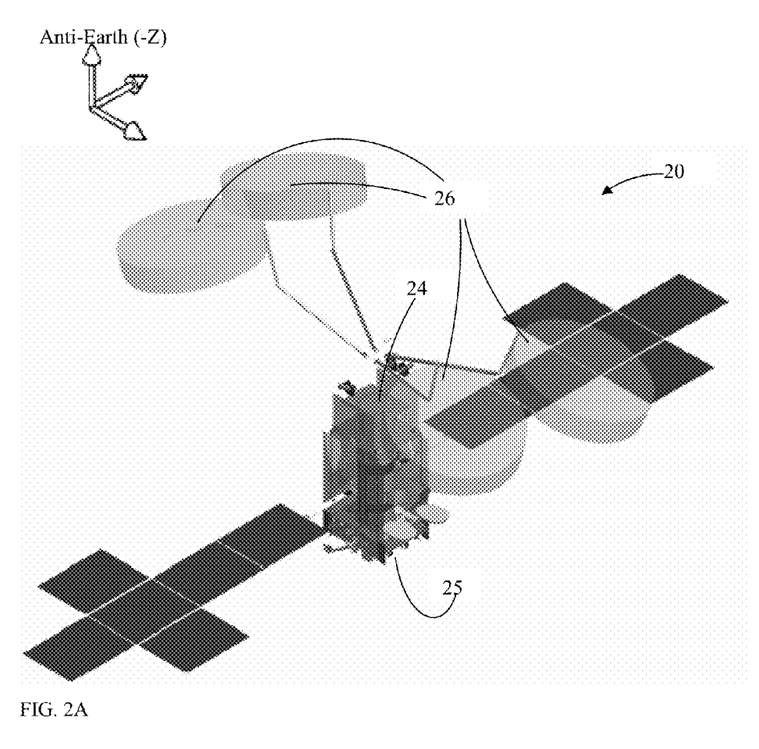
FIG. 2 illustrates an embodiment of a high capacity broadband satellite in isometric views.
Figure 2B:
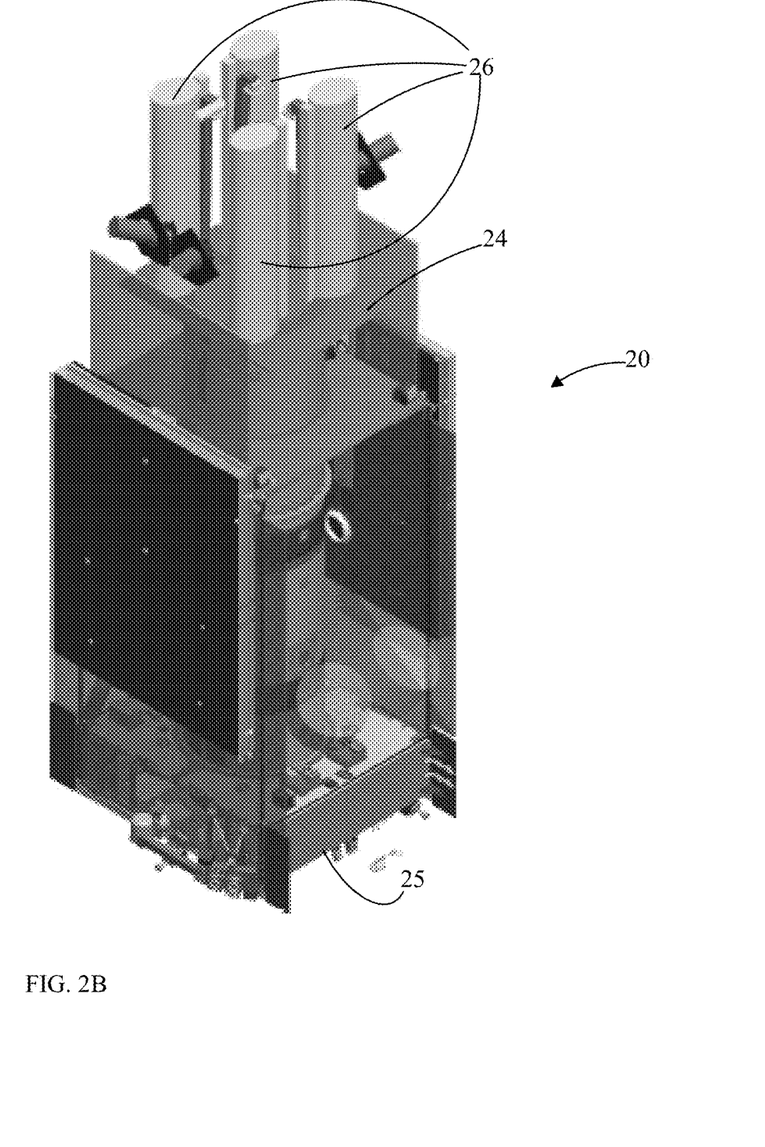

Referring now to FIG. 2A, an aft surface Earth facing configuration is illustrated, wherein forward surface 24 is directed in the anti-Earth direction and aft surface 25 is Earth facing. As described hereinafter, the inventors have found that an aft surface Earth facing configuration may be advantageously employed to provide a high capacity broadband service from an Earth orbiting satellite having a payload that includes multiple large antenna reflectors 26, particularly where, in a launch configuration, (illustrated in FIG. 2B) antenna reflectors 26 are disposed, undeployed, forward of (above) forward surface 24. Antenna reflectors 26, in a deployed configuration, may be disposed so as to be Earth facing, in a position, from which they may illuminate the Earth. In an embodiment, antenna reflectors 26 may be disposed substantially forward of forward surface 24 and "outboard" of forward surface 24, where the term outboard is defined with respect to the yaw axis and means that a distance from the yaw axis to an innermost point of antenna reflector 26 exceeds a distance from the yaw axis to the outermost point of forward surface 24. Advantageously, antenna reflectors 26 may be of an "unfurlable" type, as illustrated in FIGS. 2A and 2B, whereby a reflector 26 having a diameter, when deployed ("unfurled"), of several meters (FIG. 2A), may be disposed, when furled, in a relatively compact, approximately cylindrical, space (FIG. 2B).

In an embodiment, satellite 20 may include two or more large reflectors 26. In a launch configuration, the reflectors may be disposed, undeployed, on or proximate to and forward of the forward surface. As illustrated in FIG. 2B, for example, four reflectors having a deployed diameter of three meters or greater may be provided. Among other advantages, the disclosed configuration permits more efficient utilization of a launch vehicle fairing's conical section forward of the forward surface 14. In addition, locating the reflectors, in the undeployed launch configuration, proximate to the forward surface 14, enables a simple and mass efficient deployment scheme. Moreover, the inventors have found that the aft surface Earth facing configuration described above may enable a satellite payload to include at least four unfurlable antenna reflectors, each having a deployed diameter of five meters or more.

In an embodiment, a broadband service may be provided by such payload having a data capacity of at least 200 Gbps distributed across at least 100 user beams. Advantageously, the broadband service may provide a data capacity of at least 400 Gbps distributed across as many as 300 user beams. Advantageously, the payload may be operable at frequencies in the Ka or V-bands.

Figure 3:
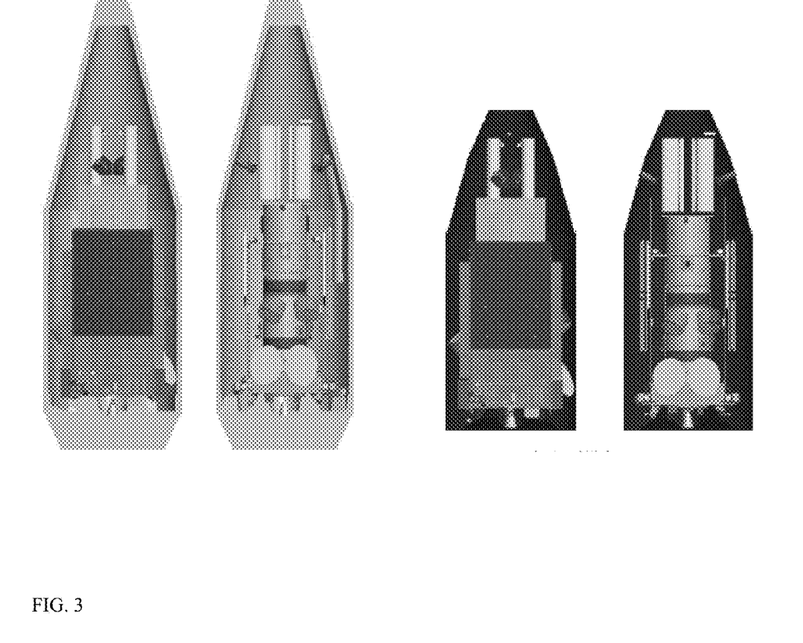
FIG. 3 illustrates launch vehicle compatibility for the high capacity broadband satellite, in accordance with an embodiment.

Referring now to FIG. 3, the configuration described herein enables a satellite that is compatible with multiple conventional launch vehicles.

Figure 4:
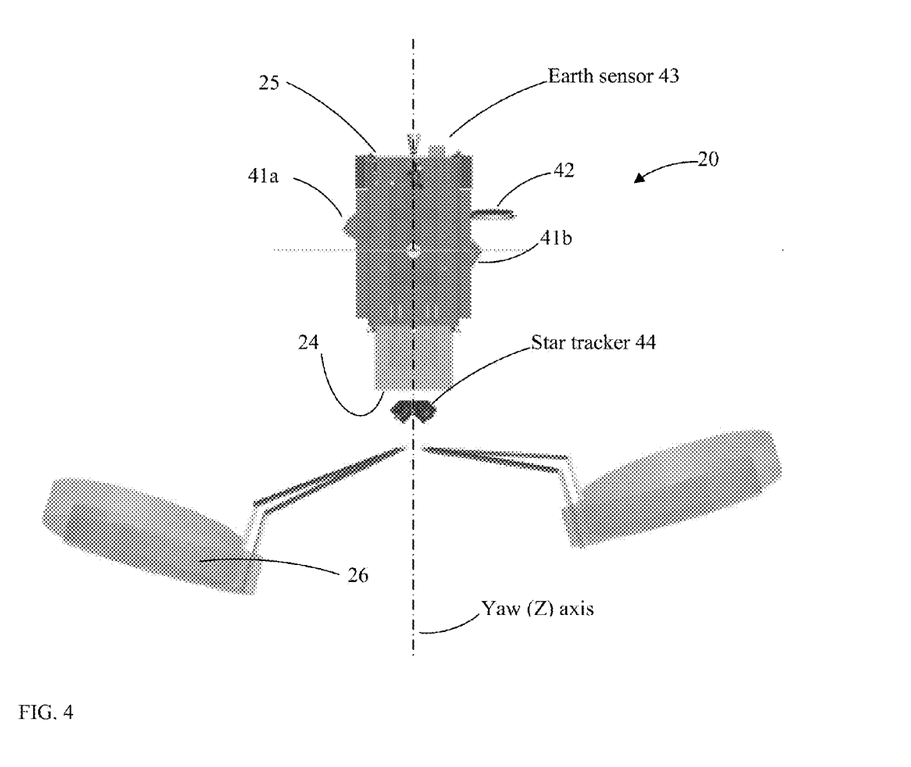
FIG. 4 illustrates an elevation view of an embodiment of a high capacity broadband satellite in an on-orbit operational configuration.

Referring now to FIG. 4, an elevation view of satellite 20 in an on-orbit operational configuration is presented. According to an embodiment, an antenna feed 41a may illuminate reflector 26 directly (single offset reflector geometry); alternatively, an antenna feed 41b may illuminate reflector 26 by way of a subreflector 42. For either geometry, the aft surface Earth facing configuration described herein has been found by the inventors to advantageously improve antenna performance by enabling an increased focal length relative to conventional configurations. The increased focal length may be realized for single offset reflectors as well as antennas with folded optics such as Gregorian or Newtonian antennas.

Moreover, the aft surface Earth facing configuration facilitates optimizing the location of antenna feeds 41a and/or 41b. In the absence of the present teachings, the conventional configuration as illustrated FIG. 1A may be modified to provide increased focal length only by moving antenna reflectors 16 aft and/or feed elements 17 forward. For example, feed elements 17 may be located further forward, even above the forward surface 14 and out of the main body 12, thus increasing the distance between the high power amplifiers, mounted inside the main body 12, and the feed elements 17. In Ka broadband applications the worst case waveguide lengths can be as much as 5 meters; with line losses degrading link performance by about 0.3 dB per meter. On the other hand, if antenna reflector 16 is located further aft, plume impingement from aft mounted stationkeeping thrusters becomes very problematic, at least because the impingement causes an attitude torque that degrades the spacecraft's pointing performance. The present inventors have found that, for the aft surface Earth facing configuration described herein, antenna feeds 41a and/or 41b may, advantageously, be located mid-panel, that is approximately equidistant from aft surface 25 and forward surface 24. Such placement is beneficial as it minimizes an average length of waveguide between amplifiers and antenna feeds, thereby minimizing line losses. In an embodiment, the inventors have determined that the average length of waveguide run may be approximately 3 meters, and provide line loss no greater than 3 dB. Advantageously, in accordance with a further embodiment, such line losses may be limited to 1.5 dB.

As further illustrated in FIG. 4, attitude control sensors may be disposed as follows: an Earth sensor 43 may be disposed proximate to and aft of aft surface 25; a star tracker 44 may be disposed proximate to and forward of forward surface 24.

Figure 5:
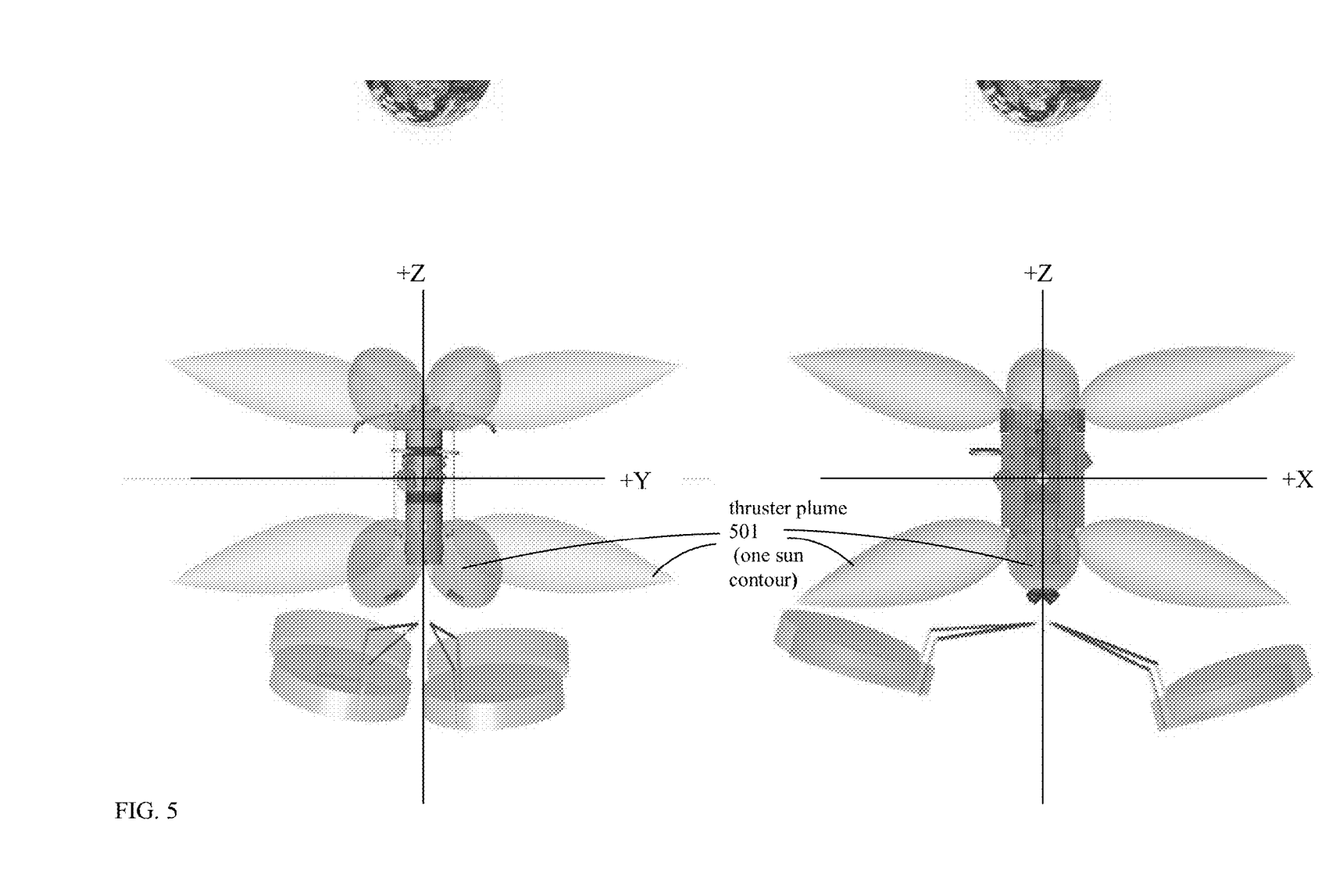
FIG. 5 illustrates elevation views in on-orbit operational configuration together with a representation of thruster plumes.

Referring now to FIG. 5, an elevation view of satellite 20 in an on-orbit operational configuration is presented with a representation of thruster plumes 501 superimposed. It may be observed that thruster plume impingement onto the deployed reflectors is substantially avoided. As a result, impingement torques may be nearly eliminated, and pointing performance of the antennas may be improved. In an embodiment an antenna pointing error is reduced to as little as 0.028 degrees. Advantageously, the pointing error may be reduced to as little as 0.023 degrees.

Thus, a high capacity broadband satellite having a payload that includes multiple large antennas has been disclosed, wherein an inverted configuration provides substantial advantages over the prior art, including, but not limited to reduced waveguide line losses, improved launch vehicle compatibility, and better antenna pointing performance.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft, comprising:
   a structural interface adapter for mating to a launch vehicle;
   an aft surface disposed, in a launch configuration within a fairing of the launch vehicle, proximate to the structural interface adapter;
   a forward surface disposed, in the launch configuration opposite to and above said aft surface;
   a main body structure disposed between said aft surface and said forward surface;
   at least one antenna reflector, wherein, the spacecraft is reconfigurable from the launch configuration to an on-orbit configuration:
   in the launch configuration, the antenna reflector is disposed, undeployed, such that no part of the antenna reflector is aft of said forward surface; and,
   in the on-orbit configuration the spacecraft is disposed with the aft surface substantially Earth facing and the forward surface substantially facing in an anti-Earth direction and the antenna reflector is disposed, deployed, so as to be Earth facing from a position substantially forward and outboard of the forward surface.

2. The spacecraft of claim 1, wherein the at least one antenna reflector comprises at least four antenna reflectors.

3. The spacecraft of claim 1, wherein the at least one antenna reflector is unfurlable.

4. The spacecraft of claim 3, wherein the at least one antenna reflector has a diameter, when deployed, of at least three meters, and is disposed, when furled, in a relatively compact, approximately cylindrical, volume.

5. The spacecraft of claim 1, wherein the at least one antenna reflector has a diameter, when deployed, that exceeds three meters and a focal length that exceeds six meters.

6. The spacecraft of claim 5, wherein an antenna feed illuminating the at least one antenna reflector is located approximately equidistant from the aft surface and the forward surface.

7. The spacecraft of claim 6, wherein an average length of a plurality of waveguides serving the antenna feed is minimized.

8. The spacecraft of claim 6, wherein the average length of the plurality of waveguides serving the antenna feed is approximately three meters.

9. The spacecraft of claim 6, wherein the average line loss associated with the plurality of waveguides is no greater than 3 dB.

10. The spacecraft of claim 6, wherein the average line loss associated with the plurality of waveguides is approximately 1.5 dB.

11. The spacecraft of claim 1, wherein torques resulting from thruster plume impingement on an antenna reflector are substantially eliminated.

12. The spacecraft of claim 1, wherein an antenna pointing error is less than 0.028 degrees.

13. The spacecraft of claim 1, wherein an antenna pointing error is less than 0.023 degrees.

14. The spacecraft of claim 1, wherein the spacecraft is compatible with a plurality of conventional launch vehicles.

15. The spacecraft of claim 14, wherein the plurality of conventional launch vehicles comprises at least two of: Ariane V, Atlas XEPF, Proton, and Sea Launch.

16. A spacecraft, comprising:
   a payload providing a data capacity of at least 200 Gbps and at least 100 user beams;
   a structural interface adapter for mating to a launch vehicle;
   an aft surface disposed, in a launch configuration within a fairing of the launch vehicle, proximate to the structural interface adapter; and,
   a forward surface disposed, in the launch configuration opposite to and above said aft surface;
   a main body structure disposed between said aft surface and said forward surface, wherein
   the payload comprises at least one antenna reflector; wherein:
   the spacecraft is reconfigurable from the launch configuration to an on-orbit configuration;
   in the launch configuration, each antenna reflector is disposed, undeployed, such that no part of the antenna reflectors is aft of the forward surface; and
   in the on-orbit configuration, the spacecraft is disposed with the aft surface substantially Earth facing, the forward surface substantially facing in an anti-Earth direction, and, each antenna reflector is deployed so as to be Earth facing from a respective position substantially forward of and outboard of said forward surface.

17. The spacecraft of claim 16, wherein the payload provides a data capacity of at least 400 Gbps distributed across approximately 300 user beams.

18. The spacecraft of claim 16, wherein the payload is operable at frequencies in the Ka or V-bands.

19. The spacecraft of claim 16, the at least one antenna reflector comprises at least four antenna reflectors.

20. The spacecraft of claim 16, wherein the at least one antenna reflector is unfurlable.

21. The spacecraft of claim 20, wherein the at least one antenna reflector has a diameter, when deployed of at least three meters, and is disposed, when furled, in a relatively compact, approximately cylindrical, volume.

22. The spacecraft of claim 16, wherein at least one antenna reflector has a diameter, when deployed, that exceeds three meters and a focal length that exceeds six meters.

23. The spacecraft of claim 22, wherein an antenna feed illuminating at least one antenna reflector is located approximately equidistant from the aft surface and the forward surface.

24. The spacecraft of claim 23, wherein an average length of a plurality of waveguides serving the antenna feed is minimized.

25. The spacecraft of claim 23, wherein the average length of the plurality of waveguides serving the antenna feed is approximately three meters.

26. The spacecraft of claim 23, wherein the average line loss associated with the plurality of waveguides is no greater than 3 dB.

27. The spacecraft of claim 23, wherein the average line loss associated with the plurality of waveguides is approximately 1.5 dB.

28. The spacecraft of claim 16, wherein torques resulting from thruster plume impingement on an antenna reflector are substantially eliminated.

29. The spacecraft of claim 16, wherein an antenna pointing error is less than 0.028 degrees.

30. The spacecraft of claim 16, wherein an antenna pointing error is less than 0.023 degrees.

31. The spacecraft of claim 16, wherein the spacecraft is compatible with a plurality of conventional launch vehicles.

32. A method of reconfiguring a spacecraft from a launch configuration to an on-orbit configuration, the spacecraft comprising a structural interface adapter for mating to a launch vehicle, an aft surface disposed, in the launch configuration within a fairing of the launch vehicle, proximate to the structural interface adapter, a forward surface disposed, in the launch configuration opposite to and above said aft surface, a main body structure disposed between said aft surface and said forward surface, and at least one antenna reflector, the method comprising:

deploying the antenna reflector from a first position wherein no part of the antenna reflector is aft of said forward surface to a second position wherein the antenna reflector is Earth facing from a position substantially forward of and outboard of said forward surface, wherein, in the on-orbit configuration, the spacecraft is disposed with the aft surface substantially Earth facing, the forward surface substantially facing in an anti-Earth direction.

* * * * *